July 15, 1958 A. G. L. MOUTET 2,843,008
APPARATUS FOR MEASURING THE TEMPERATURES OF GASEOUS
FLUIDS AND IN PARTICULAR FLAMES
Filed June 29, 1954 6 Sheets-Sheet 2

INVENTOR
André, Georges, Lucien Moutet
BY
Bailey, Stephens & Huettig
ATTORNEYS

July 15, 1958   A. G. L. MOUTET   2,843,008
APPARATUS FOR MEASURING THE TEMPERATURES OF GASEOUS
FLUIDS AND IN PARTICULAR FLAMES
Filed June 29, 1954                                    6 Sheets-Sheet 6

INVENTOR
André Georges Lucien Moutet
BY
Bailey, Stephens & Huttig
ATTORNEYS

United States Patent Office 2,843,008
Patented July 15, 1958

2,843,008

APPARATUS FOR MEASURING THE TEMPERATURES OF GASEOUS FLUIDS AND IN PARTICULAR FLAMES

André Georges Lucien Moutet, Massy, France, assignor to "Office National d'Etudes et de Recherches Aeronautiques" (O. N. E. R. A.), Chatillon-sous-Bagneux, France Application June 29, 1954, Serial No. 440,208

Claims priority, application France February 5, 1951

8 Claims. (Cl. 88—22.5)

The present invention relates to methods and apparatus for measuring the temperatures of hot gases and it is more particularly but not exclusively concerned with the measurement of the temperature of flames, either illuminating ones or not.

As it is known, these temperatures may be determined by passing through the flame to be examined a beam of rays such as light rays supplied from a source of known energetic brightness which is varied (so as to modulate the beam) according to a known law, and by comparing the energy present in the beam downstream of the flame with the value of the energy (comparison energy) present in the beam before its passage through said flame i. e. upstream thereof. The energy present in the beam downstream of the flame is equal to the sum of the energy $e$ supplied by the flame itself and of the portion of the energy $E$ supplied by the source which is not absorbed by the flame, this portion of energy $E$ being $E(1-\alpha)$, where $\alpha$ is the coefficient of absorption of the fluid which constitutes the flame. In the course of the modulation, i. e. as $E$ is varying, it passes through a value such that $E = E(1-\alpha) + e$, i. e. such that the energy absorbed from the beam by the flame is equal to the energy given off by said flame. In other words, $\alpha E = e$, or $$E = \frac{\alpha}{e}$$

which corresponds to Kirchoff's law. As it is known, the temperature of the flame is then equal to that of the black body which would have the same brightness as the source of energy from which the beam is issuing, which makes it possible to calculate the flame.

This method is applicable both to the measurement of illuminating flames and to that of non illuminating flames. In the last mentioned case, the flame to be examined is given monochromatic illuminating properties by the addition of other bodies thereto.

With such a method it is therefore necessary to modulate according to a predetermined law, generally a linear one, the energy of the radiation beam which is made to pass through the flame to be studied.

Up to the present time, this modulation was achieved by varying the brightness of the source. But this variation cannot be quick enough to make it possible to study temperatures varying at a very high rate.

The object of the present invention is to obviate this drawback.

For this purpose, in order to modulate the energy of the radiation beam which is to pass through the flame, I vary according to the desired law the ratio of the energy supplied by the source to said beam to the energy of said beam as it reaches the flame by interposing in a varying manner optical means such as filters or diaphragms between said source and said flame across the path of said beam, such filters or diaphragms being for instance mounted on a movable support, preferably constituted by a movable disc.

It is pointed out that my invention is not limited to the use of light as the radiation used for the measurement above referred to, but includes the use of any radiation of a wave length ranging from 0.2 micron to 15 microns (i. e. from ultra-violet radiation to heat rays inclusive). It suffices to make use of a source of radiation having a known intensity for a given wavelength band (this corresponding to energetic brightness in the case of the radiation being constituted by visible or invisible light energy) and to vary the transmission of energy from the source to the flame by making use of obstacle means capable of reducing or stopping transmission of this energy (this corresponding to the optical means above mentioned in the case of the radiation being constituted by light energy).

Concerning now to the comparison energy above referred to, i. e. the energy having a value equal to that of the beam as it reaches the flame, it may be obtained in different ways according to my invention.

According to a first embodiment of my invention, the source is made to supply two identical radiation beams one of which passes through the flame to be examined whereas the other constitutes a comparison beam the energy of which is modulated exactly in the same manner as that of the first mentioned beam and in synchronism with its variation, for instance under the effect of the same means as are used for modulating the first beam between the source and the flame, or of analogous means. In order to facilitate comparison of the respective energies of these two beams, these energies are transformed into electric voltages through either two identical photoelectric cells or a single one successively acted upon by the two beams.

According to another embodiment, the source gives off but one beam which is divided, after it has been modulated as above stated, into two beams one of which constitutes the measurement beam whereas the other constitutes the comparison beam.

According to still another embodiment, I do not make use of any comparison beam, but I provide a device producing a periodically variable electric voltage which is compared with the voltage obtained by the transformation of the energy of the measurement beam which has passed through the flame into electric energy, the period and law of variation of the comparison voltage being identical to the period and law of variation of the measurement beam as it is reaching the flame.

According to still another embodiment, I trace separately, by means of a recording apparatus, two curves representing the modulation of energy of the beam issuing from the source, but in one case without interposing the flame across said beam and in the other case with the flame interposed across said beam. Superimposition of these two curves gives the desired point of intersection.

Preferred embodiments of my invention will be hereinafter described with reference to the accompanying drawings, given merely by way of example, and in which:

Fig. 1 diagrammatically shows a first embodiment of the device according to my invention for measuring the temperature of an illuminating flame;

Figs. 2 and 3 separately show some elements of this device;

Fig. 4 shows curves illustrating the operation of the device of Fig. 1;

Fig. 5 diagrammatically shows a second embodiment of a device according to my invention;

Figure 13:
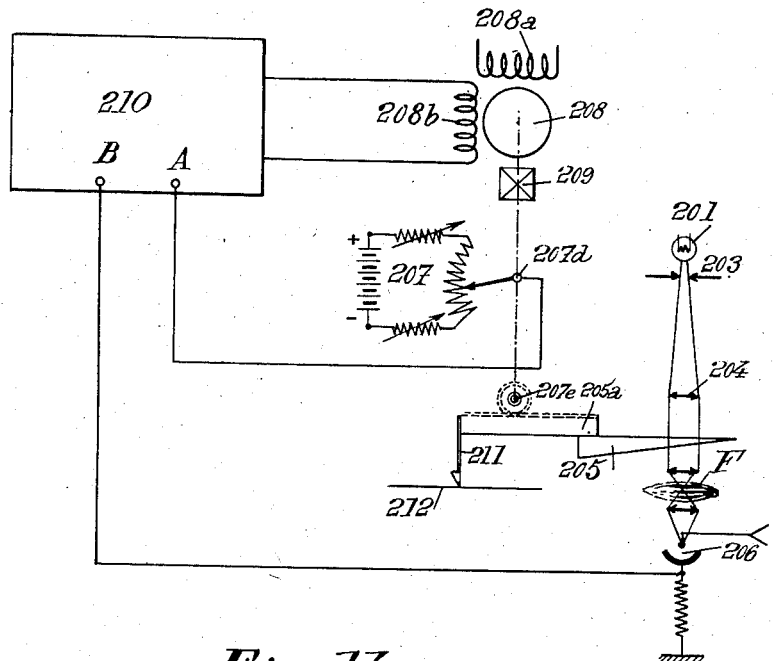
Figure 14:
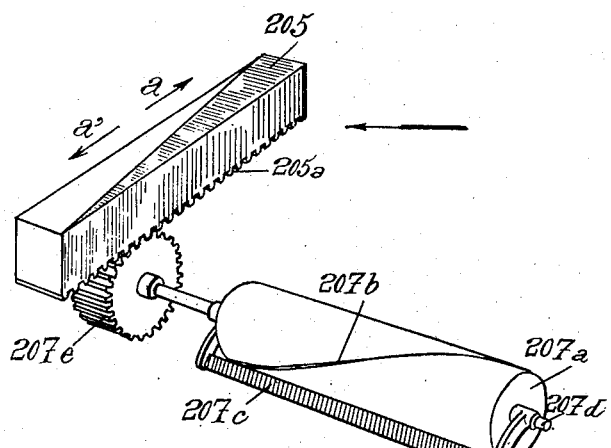

Fig. 13 diagrammatically shows a flame temperature measurement apparatus according to a modification;

Fig. 14 shows on an enlarged scale the control means of the apparatus of Fig. 13.

Figure 1:
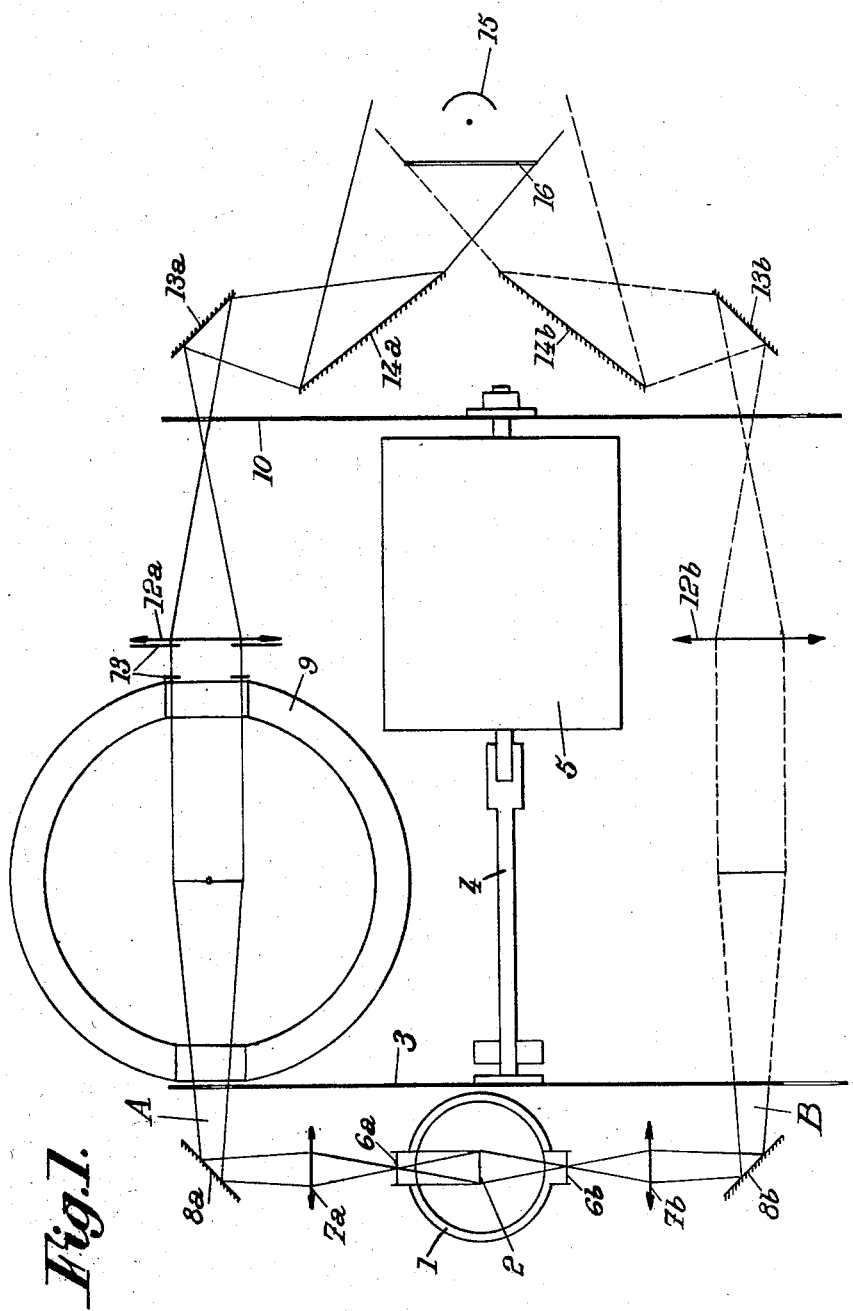

The device shown by Fig. 1 is intended to measure the temperature of an illuminating flame. It includes a lamp 1, of well determined energetic brightness (i. e. brightness for a given band of wavelengths), which may consist of a flat tungsten filament lamp (this filament being shown at 2), for instance a lamp of 6 volts and 100 watts. This lamp gives off two light beams A and B having the same energy E. One of these light beams, A, which will be hereinafter called measurement beam, is intended to pass through the flame to be measured. The other beam, B, is the comparison beam.

According to my invention, beams A and B are modulated by means of a plurality of filters having different respective transmission coefficients mounted on a moving support, for instance, as shown by the drawing, a rotating disc 3 so as to pass successively across the two light beams A and B, the above mentioned coefficients and the location of the filters on said disc 3 being chosen so that, when said disc rotates at a uniform speed, the amounts of light energy of each of these beams, after passing fully through these successive filters, are plotted along an inclined straight line on a diagram having time as abscissa and light energies as ordinates.

Every revolution of disc 3 corresponds to a measurement of the flame temperature. Thus, if the disc is rotated at sufficient speed, say 100 revolutions per second, variations of the flame temperature, even extremely quick (for instance in this particular case, occurring in $1/100$ of a second), can be recorded.

Figure 2:
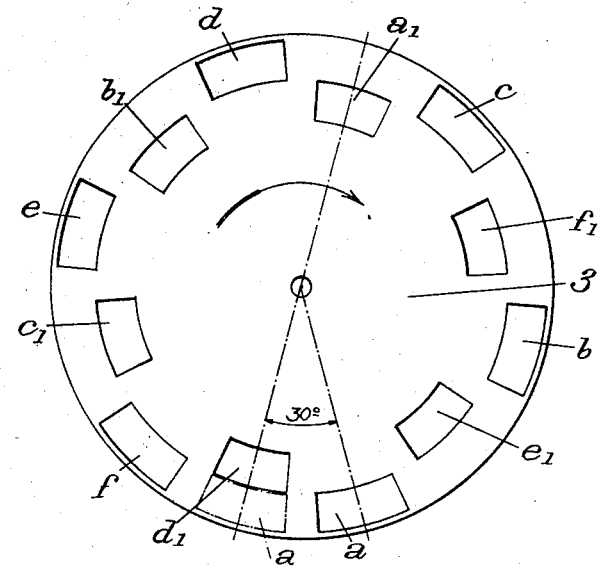
Figure 3:
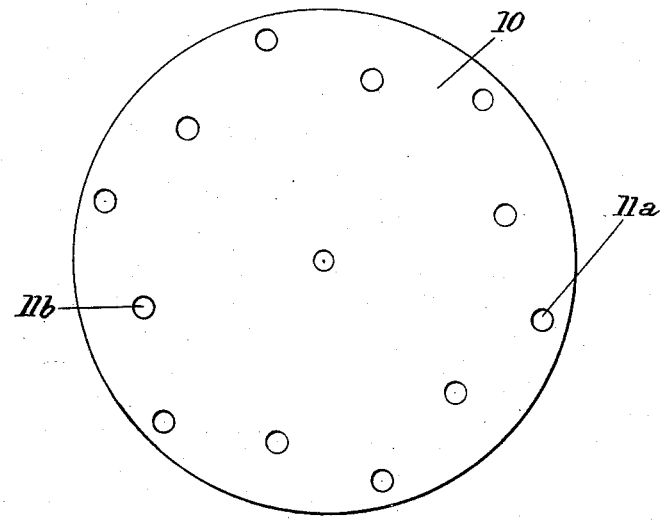

In the device shown by Figs. 1 to 3, disc 3 is provided with two circular rows of filters, respectively $a$, $b$, $c$, $d$, $e$ and $f$ and $a_1$, $b_1$, $c_1$, $d_1$, $e_1$ and $f_1$, the first of which serves to modulate the energy of the measurement beam whereas the other one serves to modulate the energy of the comparison beam. The radius of the second row is smaller than that of the first one, as shown by Fig. 2. The filters are distributed at regular intervals in each of the two rows.

Furthermore, for reasons which will be hereinafter explained, the filters of the two circular rows are angularly offset with respect to one another.

If $\tau_a$ is the coefficient of transmission of filters $a$ and $a_1$, $\tau_b$ the coefficient of transmission of filters $b$ and $b_1$, $\tau_c$ the coefficient of transmission of filters $c$ and $c_1$, $\tau_d$ the coefficient of transmission of filters $d$ and $d_1$, $\tau_e$ the coefficient of transmission of filters $e$ and $e_1$, and $\tau_f$ the coefficient of transmission of filters $f$ and $f_1$, these coefficients are chosen so that $$\tau_f - \tau_e = \tau_e - \tau_d = \tau_d - \tau_c = \tau_c - \tau_b = \tau_b - \tau_a$$

Disc 3 is mounted on the shaft 4 of an electric motor 5. In the drawing, shaft 4 is driven directly by motor 5 but, preferably, in practice, motor 5 drives shaft 4 through a belt or other suitable transmission means for protecting shaft 4 against the motor vibrations.

The two light beams emitted by source 1, after passing through diaphragms 6a, 6b and 7a, 7b respectively, are reflected by mirrors 8a, 8b so that their respective directions become perpendicular to the plane of disc 3. Furthermore, the location of mirrors 8a and 8b with respect to disc 3 is chosen so that mirror 8a projects beam A onto the outer row of filters ($a$, $b$, $c$, $d$, $e$, $f$) whereas mirror 8b projects beam B onto the inner row of filters ($a_1$, $b_1$, $c_1$, $d_1$, $e_1$, $f_1$).

Behind disc 3, beam A passes through an annular chamber 9, preferably heat insulated, for instance by means of asbestos, and made of a chemically resistant material (for instance one capable of resisting the action of $NO_3H$) inside which is the flame F to be studied.

When it leaves this chamber 9, beam A has, on the one hand, lost energy due to absorption of a portion of its radiation by the flame but, on the other hand, gained energy received from the flame. If E is the energy of the modulated beams (E having at any time the same value for beam B and beam A before it reaches the flame), $e$ the energy supplied by the flame and $\alpha$ the coefficient of absorption of the flame, it will be possible, by comparing the energy of beam B with that of beam A after its passage through the flame, to determine for which value of E, the energy E of beam B is equal to the energy $E(1-\alpha)+e$. This determination is to be made for a given wavelength or a given narrow band of wavelengths.

Of course, this determination may be carried out by making use of two devices, as identical as possible to each other, each of which measures the energy of one of the two beams. However, slight errors may result from unavoidable differences between these two devices.

Therefore, I preferably make use of a single receiver apparatus for measuring the energies of the two beams, the measurements being then carried out not simultaneously but successively at extremely short intervals of time. This is the reason why, as above stated, the filters of the two rows of disc 3 are angularly offset. Furthermore, in order to obtain a better separation of the two beams, I insert across both of them, and on the downstream side of chamber 9 for beam A, a rotary shutter 10.

This shutter 10 is constituted by a disc driven in synchronism with disc 3, by the same electric motor 5. Disc 10 is provided with two circular rows of apertures 11a and 11b, one corresponding to beam A and the other to beam B.

As shown by Fig. 3, rows 11a and 11b are concentric, the second one being inside the first, and their respective apertures are offset angularly in the same manner as the filters of the two rows provided in disc 3, every hole of row 11a being in line with a corresponding filter of the outer row of filters of disc 3 and every hole of row 11b being in line with a corresponding filter of the inner row of filters of disc 3. Thus, when beam A is allowed to pass to the energy measurement device, beam B is cut off (case of Fig. 1) while, a short time thereafter (corresponding to a rotation of 30° of discs 3 and 10), beam A is in turn cut off and beam $b$ is allowed to pass.

Preferably, I interpose, across each beam, A, B, and between discs 3 and 10, a lens, 12a, 12b, which gives said beam, in the plane of disc 10, a diameter equal to that of the holes, 11a, 11b, provided in this last mentioned disc.

Concerning beam A, I further provide, across the path of this beam and between chamber 9 and disc 10, a set of diaphragms 13 preferably constituted by two diaphragms in series. The first of these two diaphragms, located close to, or even in, the outlet aperture of chamber 9, limits the beam issuing from said chamber to the same solid angle for the flame and the image of the filament. The second diaphragm, which is practically coincident with lens 12a, and corresponds to a solid angle very slightly smaller than the solid angle of the filament, is intended to avoid measurement perturbations as might otherwise occur due to variations of the position of the flame which would cause the lens to collect parasitic light issued from the flame.

Beams A and B, after they have passed alternately through the system above described, are projected by means of mirrors 13a—14a and 13b—14b respectively onto a common receiver device constituted for instance by a photo-electric cell 15, after still passing through a colored filter 16 which allows to pass only the desired wavelength, which will be chosen to correspond to the most suitable spectrum region for examination of the flame the temperature of which is to be measured.

Generally, this filter 16 is associated with a neutral filter enabling photo-electric cell 15 to work in the zone where its characteristic curve is linear.

According to the speed of rotation of the discs, the photo-electric cell will be mounted to control either a recording galvanometer (for relatively low frequencies) or, through an amplifier, a cathode ray oscillograph.

Figure 4:
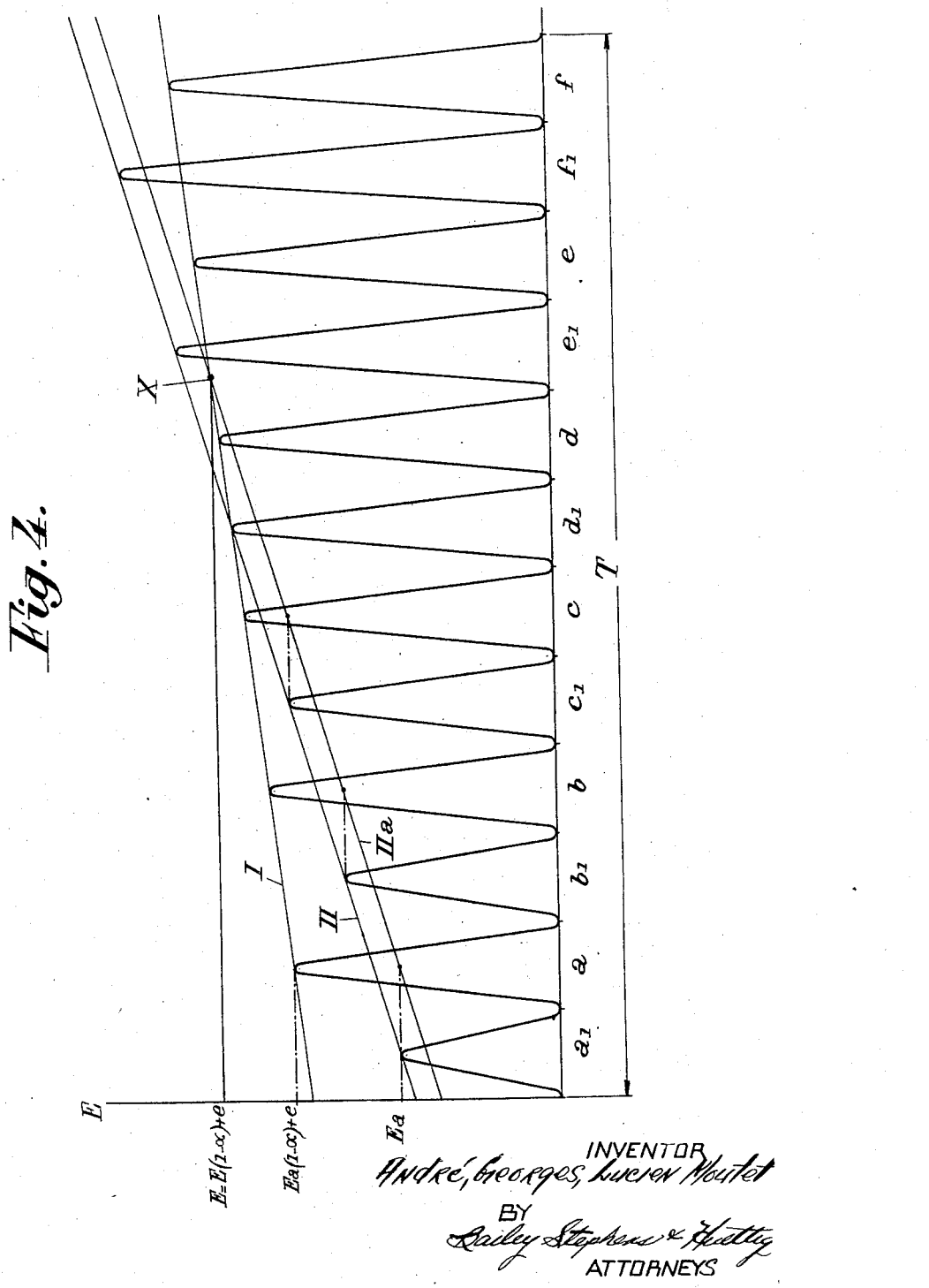

The operation of my device as above described is illustrated by the oscillogram of Fig. 4.

This oscillogram represents the variation of the energy measured by the receiver apparatus (controlled by photo-electric cell 15), the energy being in ordinates and the time in abscissas. Abscissa T, in this oscillogram, represents the time corresponding to a full revolution of discs 3 and 10. It is supposed that, at the origin of the curve shown by Fig. 4, the comparison beam B is going to pass through filter $a_1$ (inner row of filters), which is the one having the lowest coefficient of transmission. The energy thus measured increases as filter $a_1$ and the corresponding hole $11b$ are gradually enabling a greater amount of the beam to pass. It reaches a maximum when said filter $a_1$ and hole $11b$ are exactly in alinement with the beam, the energy measured for this maximum having the value determined by the coefficient of transmission $\tau a$ of filter $a_1$. Then, as the discs are rotating, in the direction of the arrow of Fig. 2, the energy which is measured decreases from said maximum to drop back to zero when filter $a_1$ moves past the comparison beam B. This gives the oscillation marked $a_1$ in the oscillogram of Fig. 4. During the duration of this oscillation, a solid portion of disc 3 (between filters $f$ and $a$) was passing across the measurement beam A.

While filter $a_1$ is moving beyond beam B, which is then stopped by the solid portion of disc 3 extending between discs $a_1$ and $b_1$, filter $a$, on the opposite side of the center of said disc, is going to pass in front of measurement beam A. This beam then starts passing through the flame and thence to photo-electric cell 15. The energy measured by the receiver apparatus associated with this cell is now that of beam A. This energy starts from zero, passes through a maximum which, since filter $a$ has the same coefficient of transmission as filter $a_1$, is $E_a(1-\alpha)+e$, and drops back to zero when filter $a$ moves past beam A. This gives the oscillation marked $a$ on Fig. 4.

Then beam A is cut off by the solid portion of disc 3 extending between filters $a$ and $b$, but beam B is allowed to pass through filter $b_1$ which passes in front of the beam. This gives oscillation $b_1$ of the curve of Fig. 4, the top of this oscillation having an ordinate $E_b$, higher than $E_a$ since the coefficient of transmission of filter $b_1$ is higher than that of filter $a_1$. Then filter $b$ allows beam A to pass while beam B is being cut off, giving the next oscillation of the curve of Fig. 4, marked $b$ and passing through a maximum $E_b(1-\alpha)+e$. And so on.

The tops of oscillations $a_1$, $b_1$, $c_1$, etc. (Fig. 4) are located along a straight line II which represents the variation of the energy of the comparison beam during one oscillation of the modulation thereof, whereas the tops of oscillations $a$, $b$, $c$, $d$, etc. are located along a straight line I which represents the variation of the energy of the measurement beam during the same time. However, in order to be able to compare these curves, it is necessary to take into account the fact that the energy measurements relating to the comparison beam took place in advance with respect to the corresponding energy measurements relating to the measurement beam, the time difference being $$\frac{T}{12}\left(\frac{T}{12}\right.$$

being the difference of abscissas between two successive oscillations of the curve of Fig. 4). Therefore line II is given, in the direction of the axis of abscissas, a translatory displacement equal to this value and becomes line II$a$.

Now, it is found that line II$a$ intersects line I at a point X. For this value of the energy of the beam, the energy given off by the flame balances exactly the energy it absorbs. Therefore, the value of this ordinate of point X makes it possible to calculate the temperature of the flame in the known manner.

It is pointed out that the intersection of lines I and II$a$ need not be located inside the field of the oscillogram. Extrapolation is easy and gives an accurate result. It is therefore possible to measure flame temperatures higher than that of the filament of lamp 1. Accordingly, the temperature of this filament will be chosen such that the lamp does not get worn too quick and also that this temperature can be determined exactly by means of an optical pyrometer.

In the above example, the discs (3 and 10) are rotated at a speed of 100 revolutions per second. As the number of filters is 12, there are 12 oscillations per revolution of said discs and the frequency of the impulses received by the energy measurement apparatus is 1200 periods. If it is desired to increase this frequency without increasing the speed of revolution of the discs, I may provide two, three or more sets of filters on disc 3 (with of course corresponding holes in disc 10) so as to obtain two, three or more cycles of modulation of the beam for every rotation of said discs.

Instead of comparing the energy of the light beam issuing from the flame (line I of Fig. 4) with the energy of the comparison light beam (line II), I may, according to another embodiment of the invention, compare the electrical impulses corresponding to line I with a comparison electric voltage supplied by an apparatus which operates independently of the source of radiation but gives however a voltage variation corresponding exactly to line II.

This voltage modulation may be for instance obtained by means of a rotating potentiometer driven in synchronism with the means for modulating the measurement beam.

Figure 5:
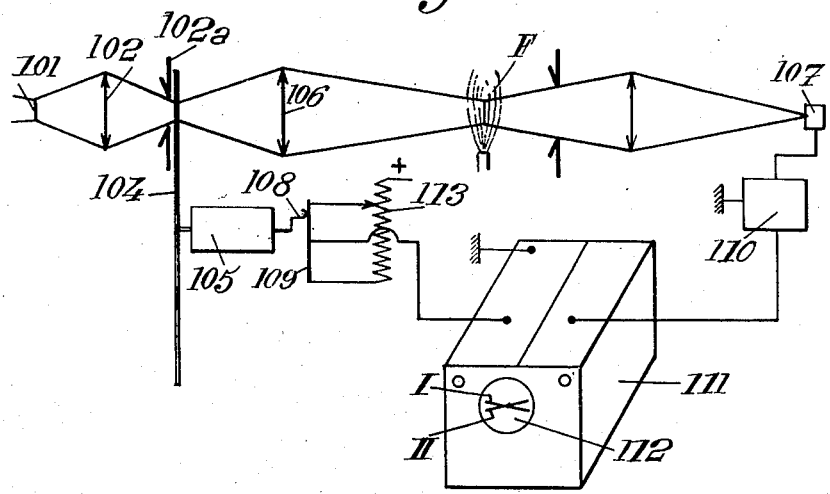

Fig. 5 shows a construction of this kind. A source of energy 101, for instance a light source of known energetic brightness, emits a radiation beam (light beam) intended to pass through the flame the temperature of which is to be measured.

Figure 7:
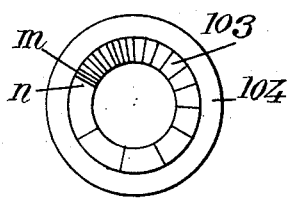
Figs. 7 and 8 show two different constructions of a device for modulating the energy of a beam of light rays.

The energy of this light beam is modulated by means of a rotary annular filter after passing through a first lens system 102 and a diaphragm device $102_a$ located in close vicinity to the filter. This filter, designated by reference numeral 103, and which is visible in front view on Fig. 7, is supported by a rotating disc 104 driven in rotation by a motor 105 at a suitable speed, say 10 revolutions per second or more, for instance 50 revolutions per second. Advantageously, the coefficient of transmission $\tau$ of filter 103 varies along its circumference (in the clockwise direction) according to a linear law from a minimum value (corresponding practically to full opacity) for point $m$ to a maximum value for point $n$. Thus, for a full revolution of disc 104 in the anti-clockwise direction, the energy of the beam varies from zero to a maximum value E max. This measurement beam, upon leaving the filter, is sent by a lens system toward flame F. After it has passed through said flame, the beam, after passing through suitable diaphragm and lens systems, strikes a photo-electric cell 107 in which it produces voltages corresponding to $E(1-\alpha)+e$, this voltage corresponding to line I of the diagram of Fig. 4.

Motor 105 further drives the rotating brush of a circular potentiometer 109 so as to vary the voltage in an electric circuit including this potentiometer in a manner corresponding to line II of Fig. 4. Brush 108 rotates in synchronism with disc 104 which carries filter 103. Furthermore, brush 108 is mounted, relatively to filter 103, in such manner that when the portion m of the filter is passing across the measurement light beam from source 101, the voltage across the potentiometer is zero. This voltage will be maximum when the portion n of the filter is passing across the measurement light beam. Thus, the voltage controlled by the potentiometer varies exactly in a way corresponding to line II of Fig. 4, which represents the energy modulation of the measurement light beam as it leaves filter 103.

The voltages supplied respectively by photo-electric cell 107 (this voltage being amplified by an amplifier 110) and potentiometer 109 are transmitted alternately, through a suitable switch device, for instance an electronic switch 111, to a cathode ray oscilloscope which shows on its screen 112 two straight lines one of which corresponds to line I of Fig. 4 and the other to line II. It is therefore possible to observe directly on screen 112 the point of intersection of these two lines, which gives the desired indication for the temperature of flame F.

When the frequency is low, electronic switch 111 may be replaced by a brush switch system making it possible to transmit to the oscilloscope alternately the voltage of the photo-electric cell and that of the potentiometer, but it will then be necessary further to provide means for framing one of the two lines.

Figure 9:
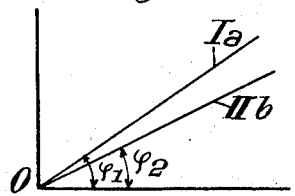
Figs. 9 and 10 show explanatory curves.

At the beginning of every series of measurements, it is necessary to adjust the voltage applied to potentiometer 109 so that this potentiometer supplies a voltage variation corresponding exactly to the above mentioned line II of Fig. 4. For this purpose, I observe the two lines formed on screen 112 when no flame F is interposed across the measurement beam. In order to comply with the requirements, both of these lines I and II must then merge into a single one. If this is not the case, that is to say if the image formed on screen 112 is as shown by Fig. 9, where the line Ia supplied by the photo-electric cell in the absence of flame F and the line IIb supplied by the potentiometer have different angular coefficients, respectively $\varphi_1$ and $\varphi_2$, line IIb is to be rotated about point O so as to bring these two lines into coincidence, by acting upon the adjustment potentiometer 113 of the main potentiometer 109. Once lines Ia and IIb have been made to coincide, the variable voltage supplied by potentiometer 109 is the true equivalent of the voltage which would be supplied by a photo-electric cell subjected to the action of the modulated measurement beam before its passage through the flame.

Figure 10:
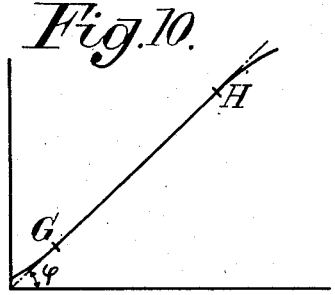

In the above description, it was supposed that circular filter 103 covers the whole range of transmission coefficients between zero value and the maximum value, which may be 1. The obtainment of such a filter may be somewhat difficult in the portions thereof corresponding to these minimum and maximum values. But these difficulties may be avoided in practice by suitably adjusting the temperature of lamp 101. It suffices to obtain that the filter gives a straight line only along a portion of its representative curve, as shown by Fig. 10, for instance between points G and H corresponding to values of the transmission coefficient equal to 0.1 and 0.9 respectively. The rectilinear portion of the characteristic curve of the filter must coincide with the straight line representing the potentiometer voltage.

When it is only desired to observe the point of intersection of lines I and II on the cathode ray oscilloscope screen (the image visible on the screen may be photographed and the photograph used to determine the flame temperature), I may dispense with any switching means by limiting for instance to a semi-circular arc the length of filter 103a (Fig. 8) fitted in a rotating disc 104a, the potentiometer resistance being then disposed along the complementary semi-circle. Thus disc 104a cuts off the measurement beam when the potentiometer supplies the comparison varying voltage, whereas the production of this voltage is cut off when the measurement beam is modulated by filter 103a.

Figure 8:
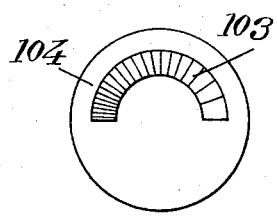

The layout of such an apparatus is then similar to that illustrated by Fig. 5, where the filter means 103 are made as shown by Fig. 8 and the potentiometer 113 is arranged to transmit current only during every half revolution for which the filter means 103 are not passing across the beam. In this case there is no need of a special switch and 111 would designate the oscilloscope.

Simultaneity of the modulation of the measurement beam of the comparison voltage is however necessary when it is desired to make use, for recording the point of intersection of lines I and II, of an automatic recorder. In this case, both of the voltages (to wit that corresponding to the variation of the energy of the beam after its passage through the flame and that corresponding to the variation of the energy of said beam before this passage) are applied simultaneously to this recorder. The recorder is arranged in such manner as to mark a point every time the two voltages applied thereto are equal. A recorder of this kind may be for instance that designed by Mr. Van Den Broek. In this case, the modulating means may be made as shown by Figs. 5 and 7. It is advantageous to provide, in addition to such a recorder and in parallel therewith, a cathode ray oscilloscope which is operated, through suitable switch means and in particular an electronic switch, by the voltages supplied on the one hand by photo-electric cell 107 and on the other hand by potentiometer 109. This oscilloscope is, in particular, advantageous to achieve the adjustment of the potentiometer by bringing lines I and II into coincidence when no flame is used.

Figure 6:
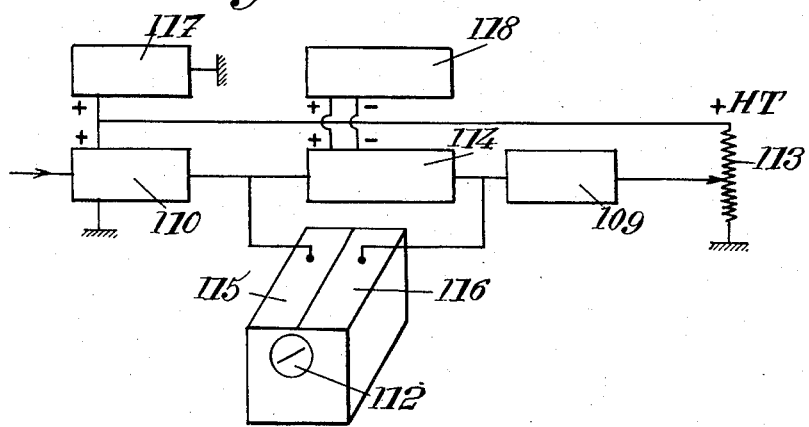
Fig. 6 shows a modification of the device of Fig. 5.

Fig. 6 diagrammatically shows the recorder and the oscilloscope mounted in parallel. The same reference numerals designate the same parts as in Fig. 5. The outputs of amplifier 110 and potentiometer 109 are connected on the one hand to an impulse amplifier 114 which transmits these impulses to the recorder and on the other hand respectively to the amplifiers 115 and 116 of an electronic switch which is connected with a cathode ray oscillograph the screen of which is shown at 112. 117 and 118 designate respectively a stabilized feed device and a feed device insulated from the earth.

The use of the apparatus of Fig. 6 corresponds to that of the apparatus of Fig. 5. Potentiometer 109 is first adjusted by means of potentiometer 113 as above explained. Then the measurement proper is carried out (measurement beam passing through the flame). On every revolution of disc 104, the recorder marks a point when the voltages from 109 and 110 are equal. If the rate of rotation is ten per second, the recorder marks ten points per second, each indicating a value of the temperature. When the measurement is finished, it is a good thing to again check the adjustment of potentiometer 106 by means of the oscilloscope screen.

When no comparison beam is used, owing to its replacement by a comparison voltage, the apparatus can be used for measuring the temperatures of flames whether they are illuminating flames or not. It suffices, for this purpose, to use, instead of a mere photo-electric cell 107 (Fig. 5), a monochromator device (including such a cell) on the entrance slit of which the image of filament 101 is projected.

When the flame the temperature of which is to be measured is an illuminating flame, the region of the spectrum in which the temperature measurement is to be made is chosen and the monochromator is adjusted to correspond to this wavelength. Furthermore, the output slit of this monochromator is adjusted to correspond to the desired interval $\Delta\lambda$. The above described adjustment in the absence of the flame is then carried out. When the flame to be measured is produced, photo-electric cell associated with the monochromator proper, at the output thereof, receives (exactly under the same angle, over the same area and with the same optical path) the transmitted energy $E(1-\alpha)+e$. The apparatus fitted with a monochromator may be used, as above described, either by direct reading or with an automatic recording.

When the flame the temperature of which is to be measured is a non-illuminating flame, I add to the flame a substance which gives it a substantially monochromatic color. This substance is chosen so as to obtain an emission spectrum line. The monochromator is adjusted to this wavelength, if necessary, by producing a spectrum of the substance. Then the measurement apparatus is adjusted in the absence of a flame as above explained. When the flame is produced, the monochromator receives exactly in the same conditions and for the same wavelength the transmitted energy $E(1-\alpha)+e$. In this case also, the apparatus may be used either by direct reading or with automatic recording.

When the substance added to a non illuminating flame is sodium, one of the two lines of the doublet may be studied, which avoids the error which would result from measuring the interval between the two spectrum lines.

It should be well understood that, in the method and apparatus according to my invention, I may make use of other means than filters for modulating the energy of the radiation beam issuing from the source (lamp 101). In particular I may take advantage of the fact that an opaque obstacle, interposed across the beam, constitutes a filter having a coefficient of transmission equal to zero, whereas the absence of any obstacle or filter may be considered as equivalent to a filter having a coefficient of transmission equal to 1. Therefore, if I interpose across the path of the beam a rotating disc provided with slots or holes for intermittently allowing said beam to pass, I obtain a modulation of the energy of this beam.

Figure 11:
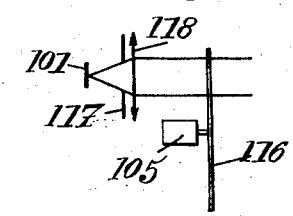
Figs. 11 and 12 show still another device for modulating the energy of a beam of light rays.
Figure 12:
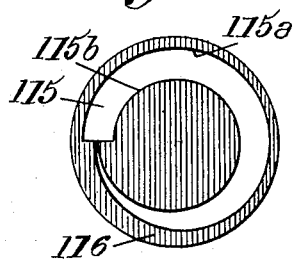

I may also, as shown by Fig. 12, make use of a rotating disc 126 provided with a circular slot 125 having a width which varies from one end thereof to the other, this slot being arranged to pass across a portion of the light beam where the rays thereof are parallel, and for instance perpendicular to said disc. With such an arrangement, as disclosed by way of example by Fig. 11, a light beam produced by a source 101 first passes through a diaphragm 127, is made parallel by a lens system 128 and then passes through the portion of slot 125 located across its path. Preferably, the slot is limited by two spirals 125a and 125b (Fig. 12).

Concerning the means for obtaining a varying comparison voltage, they are not limited to the use of a potentiometer. For instance, I might make use for this purpsoe of a device including an auxiliary light source and a photoelectric cell receiving the luminous flux from said source and modulated through any suitable means (rotating filter, variable width slot, etc.).

The varying comparison voltage might also be obtained through means analogous to the time base arrangements used in television for obtaining saw tooth voltage, one of these arrangements being for instance a thyratron with a load tube.

The two last mentioned means make it possible to obtain high frequency voltage modulation.

According to still another embodiment of my invention, a light beam from the source, suitably modulated as above indicated, is divided, after modulation, into two elementary beams one of which constitutes the measurement beam and the other the comparison beam.

The apparatus made according to the modification of Figs. 13 and 14 includes a source 201 of given energetic brightness constituted for instance by a tungsten flat filament. This lamp produces a beam of light rays which is to pass through flame F the temperature of which is to be measured.

The light beam issuing from lamp 201 passes, before reaching flame F, first through a diaphragm device 203 and through a lens system which makes the rays of the beam parallel.

In order to vary the energy of the light ray beam before it enters the flame, I may use any suitable means, for instance a filter of variable transparency, or a diaphragm of variable opening interposed across the path of the parallel ray light beam.

According to the embodiment shown by the drawing, such a filter is made in the form of a photometric wedge 205 movable in the direction of its length either toward the right or toward the left (arrows a and a' of Fig. 14), this filter reducing the energy of the light beam that has passed therethrough in direct proportion to the thickness of the portion of the wedge which is interposed across the path of the beam.

After passing through filter 203, the light beam passes through the flame to be examined and then strikes a photosensitive element constituted for instance by a photo-electric cell 206.

The comparison energy may be produced by any suitable means, for instance by dividing the light beam emitted from lamp 201 at a point between filter 203 and the flame and by making use of one of the branches of the beam thus divided as comparison energy, whereas the other portion of the beam passes through the flame in order to supply the measurement energy.

However it seems particularly advantageous to use as comparison energy the energy supplied by an electric current source and varied by a logarithmic potentiometer 207 according to the same law as the law of variation of the light beam passing through wedge 205. Furthermore, it seems advantageous to have the electric energy supplied by cell 206, when said cell receives the light beam without interposition of flame F, equal at any time and whatever be the position of wedge 205 and potentiometer 207, to that of the current which is varied by means of said potentiometer.

In order to obtain this result, wedge 205 is mechanically connected with a movable element of the potentiometer. This movable element may be constituted by a cylinder 207a carrying a kind of helical ridge 207b which cooperates with the windings 207c of the potentiometer. In order to obtain the desired relation between the movement of rotation of cylinder 207a and the translatory movement of wedge 205, the shaft 207d of cylinder 207a carries a pinion 207e which meshes with a rack 205a rigid with wedge 205. The diameter of pinion 207e is for instance chosen in such manner that when the wedge has moved a distance equal to its whole length, cylinder 207a has rotated through 360°.

Shaft 207d is driven in rotation by an electric motor 208 through a speed reducing gear 209 including for instance an endless screw. This motor 208 is itself differentially controlled both by the measurement energy supplied by cell 206 and by the comparison energy supplied at the output of potentiometer 207. For this purpose, motor 208 may be made of a two-phase motor having one of its windings (208, 208a in the drawing) directly fed from the distribution network, whereas the other winding 208b, called "control winding," is fed with a current which varies in accordance with the value of the difference between the intensities applied directly at A and B to an amplifier 210 and which correspond respectively to the measurement and comparison energies. As long as winding 208b is fed with current in one direction or the other, motor 208 rotates in one direction or the other and causes both wedge 205 and cylinder 207a to move. When the two energies, to wit the measurement energy and the comparison energy, balance each other, motor 208 stops and the position of wedge 205 (or the corresponding position of cylinder 207a) indicates the temperature of flame F at this time. If subsequently the temperature of the flame again varies, a current passes through winding 208b in one direction or the other, so that motor 208 again rotates and displaces wedge 205 and the potentiometric movable element until a new balanced state is again reached.

The position of wedge 205 (or of the element 207a of the potentiometer) may be used to indicate the different temperatures of flame F.

A particularly simple method of graphically indicating the variations of temperature of the flame consists in fixing upon wedge 205 or upon an element rigid therewith a stylus 211 which traces on a recording paper strip 212 a curve indicating the variations of temperature of the flame.

It should be noted that the apparatus according to the present invention is applicable in all cases where the number of measurements to be made per unit of time does not exceed a given limit, the time of response of this device being generally of at most one tenth of a second.

In a general manner, which I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

This application is a continuation-in-part of my U. S. application Ser. No. 270,089 of Feb. 5, 1952, now abandoned.

What I claim is:

1. A device for measuring the temperature of a gaseous energy radiating fluid which comprises, in combination, a source of radiation of a wavelength ranging from 0.2 to 45 microns and of a substantially constant intensity, means including a radiation responsive element for measuring the energy of a radiation beam striking said radiation responsive element, means for directing a radiation beam from said source onto said energy measuring means, movable beam energy reducing means disposed across the path of said last mentioned beam for absorbing a portion of the energy thereof variable in accordance with the position of said energy reducing means with respect to said beam, means interposed between said energy absorbing means and said energy measuring means for passing a stream of said gaseous fluid across the path of said beam, motor means for moving said energy reducing means and means operatively connected with said radiation responsive means for indicating the value measured by said energy measuring means at the time when the energy of the radiation beam which has passed only through said varying absorbing means and the energy of the radiation beam emerging from said gaseous fluid stream become equal to each other.

2. A device for measuring the temperature of a gaseous energy radiating fluid which comprises, in combination, a source of radiation of a wavelength ranging from 0.2 to 45 microns and of a substantially constant intensity, means including a radiation responsive element for measuring the energy of a radiation beam striking said radiation responsive element, means for directing a radiation beam from said source onto said energy measuring means, movable filter means disposed across the path of said last mentioned beam for absorbing a portion of the energy thereof variable in accordance with the position of said filter means with respect to said beam, means interposed between said filter means and said energy measuring means for passing a stream of said gaseous fluid across the path of said beam, motor means for moving said filter means, and means operatively connected with said radiation responsive means for indicating the value measured by said energy measuring means at the time when the energy of the radiation beam which has passed only through said varying absorbing means and the energy of the radiation beam emerging from said gaseous fluid stream become equal to each other.

3. A device for measuring the temperature of a gaseous fluid which comprises, in combination, a source of radiation of a wavelength ranging from 0.2 to 45 microns and of a substantially constant intensity, means responsive to variation of the energy of a radiation beam incident thereon for supplying an electric voltage varying in accordance with said energy variation, means for forming a radiation beam issuing from said source and directed toward said voltage supplying means, a disc-shaped support rotatable about an axis parallel to the path of said beam between said source and said voltage supplying means, a multiplicity of filter elements set in said disc-shaped support along a circular arc so as to be successively interposed across said beam as said support is rotated about said axis, said filter elements having different respective coefficients of transmission varying gradually in the same sense along said circular arc, means for passing a stream of said gaseous fluid across the portion of the path of said beam located between said filter elements and said voltage supplying means, an electric current source, potentiometric means having their input connected with said source, said potentiometric means including a rotating member for varying according to its position the resistance between said input and the output of said potentiometric means, motor means for rotating simultaneously said rotatable support and said member, said potentiometric means being arranged so that said resistance thereof, in the course of the rotation of said member along an arc equal to the first mentioned arc, supplies at the output of said potentiometric means a voltage proportional with the energy variation of said beam after its passage through said successive filter elements and before its passage through said gaseous stream, a cathode ray tube and means for connecting the outputs of said voltage supplying means and said potentiometric means with said cathode ray tube.

4. A device for measuring the temperature of a gaseous fluid which comprises, in combination, a source of radiation of a wavelength ranging from 0.2 to 45 microns and of a substantially constant intensity, means responsive to variation of the energy of a radiation beam incident thereon for supplying an electric voltage varying in accordance with said energy variation, means for forming a radiation beam issuing from said source and directed toward said voltage supplying means, multiplicity of filter elements having different coefficients of transmission respectively, means for displacing said multiplicity of filter elements to interpose them successively across the path of said beam toward said voltage supplying means, said successive filter elements having coefficients of transmission varying gradually in the same sense, means for passing a stream of said gaseous fluid across the portion of the path of said beam located between said filter elements and said voltage supplying means, an electric current source, potentiometric means having their input connected with said source, said potentiometric means including a moving member for varying according to its position the resistance between said input and the output of said potentiometric means, motor means for simultaneously displacing said multiplicity of filter elements and said potentiometric member, said potentiometric means being arranged so that said resistance thereof, in the course of any displacement of said member, supplies at the output of said potentiometric means a voltage proportional with the variation, during the time of this displacement, of the energy of said beam after its passage through said filter elements and before its passage through said gaseous stream, a cathode ray tube, and means for alternately connecting the outputs of said voltage supplying means and said potentiometric means with said cathode ray tube.

5. A device according to claim 3 in which said circular arc extends over a whole circumference, further including between the outputs of said voltage supplying means and said potentiometric means on the one hand, and said cathode ray tube on the other hand, an electronic switch for connecting said respective outputs alternately with said tube.

6. A device according to claim 3 in which said circular arc is equal to at most one half of a circumference, said potentiometric means being arranged to supply voltage to said cathode ray tube only when the solid part of said disc-shaped support is passing across said beam.

7. A device for measuring the temperature of a gaseous fluid which comprises, in combination, a source of radiation of a wavelength ranging from 0.2 to 45 microns and of a substantially constant intensity, means responsive to variation of the energy of a radiation beam incident thereon for supplying an electric voltage varying in accordance with said energy variation, means for forming a radiation beam issuing from said source and directed toward said voltage supplying means, means, located between said source and said voltage supplying means, movable across said beam for absorbing a portion of the energy thereof, said energy absorbing means being of variable density along the direction of its movement, so that the energy absorbed by said last mentioned means is variable according to the position of said energy absorbing means with respect to said beam, means for passing a stream of said gaseous fluid across the portion of the path of said beam located between said energy absorbing means and said voltage supplying means, an electric current source, potentiometric means having its input connected with said electric source and including two elements movable with respect to each other to give at the output of said potentiometric means a voltage variable in accordance with the relative position of said two elements, motor means operatively connected on the one hand with said movable energy absorbing means and on the other hand with one of said potentiometric elements for simultaneously and correspondingly moving said energy absorbing means with respect to said beam and said potentiometric elements with respect to each other in such manner that the voltage output of said potentiometric means varies in accordance with the variation of the energy of said beam after its passage through said energy absorbing means and before its passage through said stream of gaseous fluid and means differentially connected with the outputs of said voltage supplying means and said potentiometric means for stopping said motor means when the ratio of the voltages at said outputs is equal to a given value.

8. A device according to claim 7 in which said energy absorbing means consist of a photometric wedge-shaped filter movable back and forth in the direction of its slope.

References Cited in the file of this patent

UNITED STATES PATENTS

| | | |
|---|---|---|
| 1,672,671 | Young | June 5, 1928 |
| 1,898,219 | Sharp | Feb. 21, 1933 |
| 2,166,824 | Runaldue | July 18, 1939 |
| 2,517,554 | Frommer | Aug. 8, 1950 |
| 2,528,924 | Vassy | Nov. 7, 1950 |
| 2,544,196 | Varden | Mar. 6, 1951 |
| 2,690,511 | Elion | Sept. 28, 1954 |

OTHER REFERENCES

Instruments, vol. 20, pages 978, 980, November 1947, Publ. Instruments Publ. Co., 921 Ridge Avenue, Pittsburg, Penna.